United States Patent [19]

Wakai et al.

[11] 3,772,463

[45] Nov. 13, 1973

[54] CHROMINANCE AMPLIFIER WITH PROVISION FOR GAIN CONTROL AND COLOR KILLER ACTION

[75] Inventors: Shuzo Wakai, Kyoto; Hitoshi Sugano, Takatsuki, both of Japan

[73] Assignee: Matsushita Electronics Corporation, Osaka, Japan

[22] Filed: Feb. 24, 1972

[21] Appl. No.: 229,141

[30] Foreign Application Priority Data

Mar. 5, 1971 Japan .............................. 46/12068

[52] U.S. Cl.... 178/5.4 R, 178/5.4 AC, 178/5.4 CK, 330/30 D

[51] Int. Cl. .......................................... H04n 9/48

[58] Field of Search............. 178/DIG. 15, DIG. 26, 178/DIG. 29, 5.2 A, 5.4 AC, 5.4 SY, 5.4 MC, 5.4 CK, 5.4 R; 330/30 D

[56] References Cited

UNITED STATES PATENTS 3,445,780 5/1969 Beelitz ............................ 330/30 D

*Primary Examiner*—Robert L. Richardson
*Attorney*—Richard K. Stevens et al.

[57] ABSTRACT

A chrominance amplifier circuit, adapted to be formed in a monolithic integrated circuit, in which an automatic gain control function is performed by a circuit arrangement containing no capacitor, the automatic gain control function having no influence on the bandwidth characteristic of the amplifier so that the chrominance amplification operation can be stably performed.

1 Claim, 2 Drawing Figures

CHROMINANCE AMPLIFIER WITH PROVISION FOR GAIN CONTROL AND COLOR KILLER ACTION

The present invention relates to a chrominance amplifier, and more particularly to a chrominance amplifier which also has an automatic gain control function and which is well adapted to be formed in a monolithic integrated circuit.

A conventional video intermediate frequency amplifier for use in a television receiver requires an automatic gain control circuit.

Figure 1:
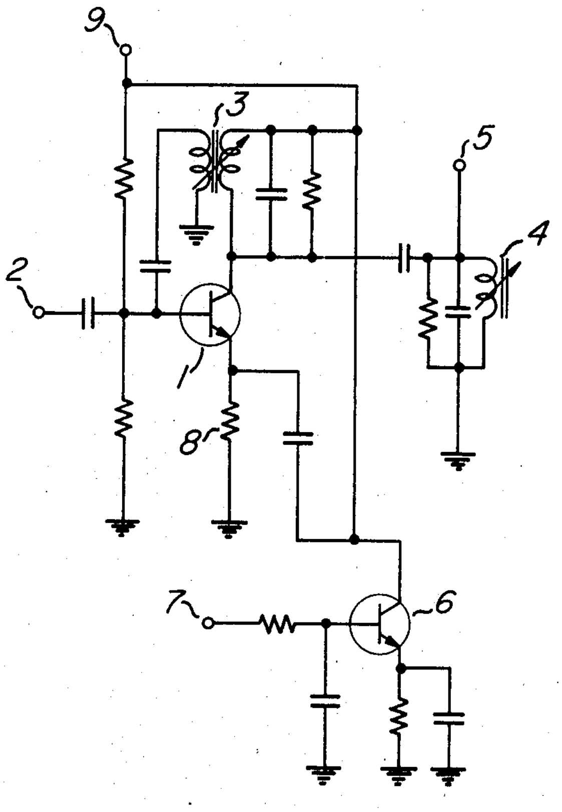
FIG. 1 PRIOR ART
Figure 2:
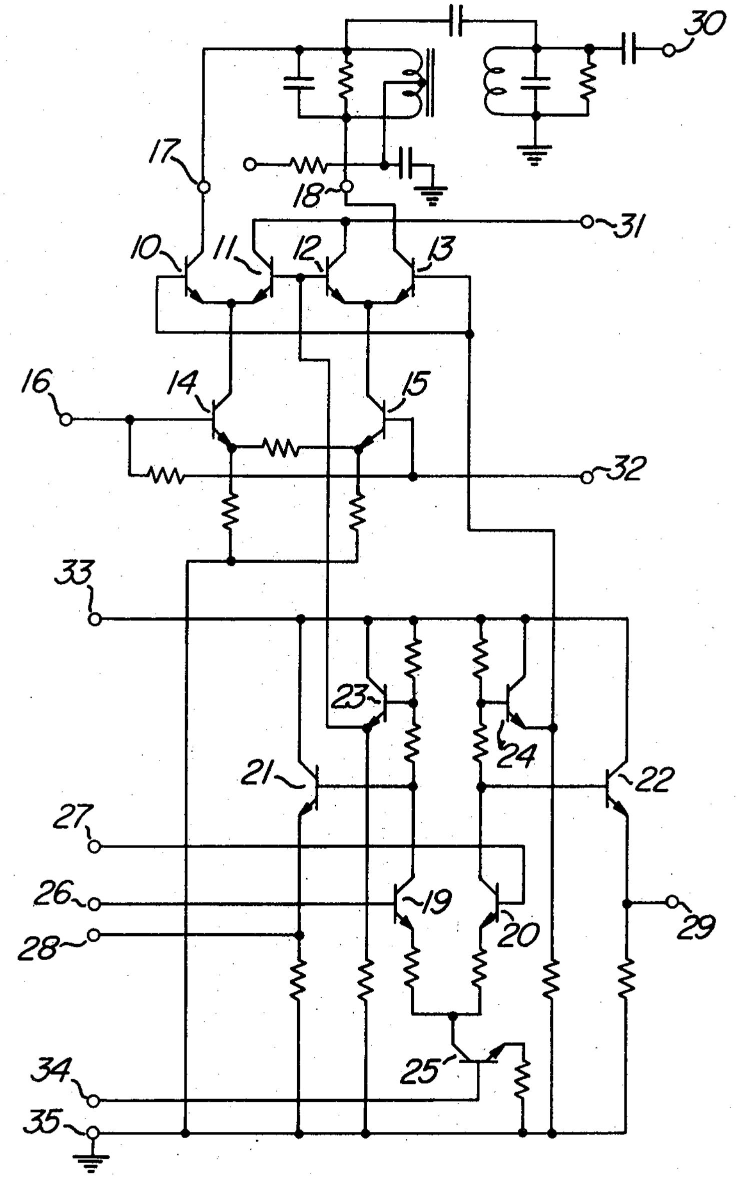

For a better understanding of the present invention reference may be made to the attached drawings in which:

FIG. 1 shows the electronic circuit of a conventional chrominance amplifier; and FIG. 2 shows the electronic circuit of a chrominance amplifier designed according to the present invention.

FIG. 1 shows a conventional chrominance amplifier which has been proposed to fulfill such a need. In FIG. 1, numeral 1 indicates a transistor for chrominance amplification, 2 a terminal to receive an input signal, 3 and 4 bandpass transformers constituting double tuned circuits of the capacitor-coupled type, 5 an output terminal, 6 a transistor serving to perform an automatic gain control function as a dc amplifier, and 7 a terminal through which a dc voltage for automatic gain control is applied to the transistor 6.

The automatic gain control action of this circuit will next be described. The circuit shown in FIG. 1 is so designed that if the output is decreased the dc automatic gain control voltage applied to the terminal 7 is increased. When the voltage applied to the terminal 7 is elevated to or above a certain level, the transistor 6 turns on, and therefore the sum of the impedances of the resistor 8 coupled to the emitter of the transistor 1 and the emitter-collector path of the transistor 6 becomes small so that the gain of the transistor 1 will be increased.

On the other hand, as the output is increased, the voltage applied to the terminal 7 is lowered, and therefore the transistor 6 turns off so that the sum of the impedances of the resistor 8 and the emitter-collector path of the transistor 6 becomes large, whereby the gain of the transistor 1 is decreased. Thus, with the aid of the transistor 1, the circuit shown in FIG. 1 can play a role of an amplifier which also has an automatic gain control function. In this figure, a terminal 9 is one through which a bias voltage is supplied.

With this conventional circuit arrangement for a chrominance amplifier, the large value of the difference in the impedance of the emitter-collector path between the conducting state and cutoff state of the transistor 6 can not be obtained. In addition, since the gain control depends directly upon the voltage applied to the terminal 7, the stabilization of the absolute value of the voltage is of primary importance.

Moreover, an attempt to fabricate such a circuit as described above in conjunction with FIG. 1 in a monolithic integrated circuit configuration encounters a problem. Namely, the capacitances of some capacitors to be included in the circuit are too large to be realized in a monolithic integrated circuit. Consequently, such capacitors must be discrete parts and externally connected to the integrated circuit. In this case, a larger number of terminals on the integrated circuit are necessary for connection to associated external circuits. The larger the number of terminals associated with the external circuits, the more expensive is the integrated circuit.

The present invention has been made to eliminate such a problem as is raised with the conventional chrominance amplifier. The chrominance amplifier according to the present invention includes no capacitor therein and all of the circuit components are constituted of transistors and resistors. Nevertheless, it can also perform an automatic gain control function with the requirement for stabilizing the absolute value of the gain control voltage rendered less severe. The present invention will now be described by way of an embodiment as shown in FIG. 2. In FIG. 2, transistors 10, 11, 12, 13, 14 and 15 mainly constitute a chrominance amplifier part. A chrominance signal is applied from a terminal 16 to the bases of the transistors 14 and 15. Then, the outputs obtained in a balanced condition at terminals 17 and 18 are fed to a double tuned circuit.

Transistors 19, 20, 21, 22, 23, 24 and 25 mainly constitute a dc amplifier part for the automatic gain control voltage. Control voltages for automatic gain control as well as for killer action are respectively applied from terminals 26 and 27 to the bases of the transistors 19 and 20 in a differential form. Output control voltages for killer action are delivered at terminals 28 and 29 through transistors 21 and 22 connected in emitter follower configuration whose bases are respectively connected with the collectors of the transistors 19 and 20.

In addition, in order to eliminate any influence of loads connected to the collectors of the transistors 19 and 20, transistors 23 and 24 in emitter follower configuration are incorporated in this circuit and through them are applied dc automatic gain control voltages to the bases of the transistors 11 and 12 and the bases of the transistors 10 and 13 in a differential form. Reference numeral 30 designates an output terminal; 31, 32, 33 and 34 dc bias supply terminals; and 35 a ground terminal.

The magnitude of the voltage applied to the terminal 26 has a constant value independent of the level of the input signal, and the voltage applied between the terminals 26 and 27 is controlled by a control circuit (not shown) which varies the magnitude of the voltage applied to the terminal 27 in corresponding relation to the variation in the magnitude of the input signal.

In this circuit, for example, if the level of the input signal is decreased, the voltage applied to the terminal 27 is also decreased which is the bias voltage supplied for the base of the transistor 20. Consequently, the emitter-collector current of the transistor 20 is decreased and the emitter voltage of the transistor 24 is increased, so that the bias voltages applied to the bases of the transistors 10 and 13 are increased to add to the outputs from them.

On the other hand, if the level of the input signal is increased, the opposite circuit operation will be observed. Namely, the increase in the input signal is accompanied by the increase in the voltage applied to the terminal 27, the increase in the bias voltage applied to the base of the transistor 20, the increase in the collector current of the transistor, the decrease in the emitter voltage of the transistor 24, the decrease in the bias voltages applied to the bases of the transistors 10 and 13, and the consequent decrease in the outputs therefrom.

As apparent from the previous description, according to the invention, the chrominance amplifier shown in FIG. 2 can perform an automatic gain control function in that the decrease in the input signal level is accompanied by an increase in the output and therefore an increase in the gain while the increase in the input signal level is attended upon by a decrease in the output and hence a decrease in the gain.

It is, therefore, concluded from this and above that a chrominance amplifier circuit which includes no capacitor and which still has such an automatic gain control function as attained by the conventional circuit configuration, can be realized.

Namely, the absence of capacitors in the circuit will be of great merit especially in case where the circuit is formed in an monolithic integrated circuit configuration.

Further, according to the circuit presently invented, due to the use of a differential amplifier, the range of gain control is very much broadened in comparison with the conventional chrominance amplifier.

Moreover, in the circuit of the chrominance amplifier according to the invention, the gain is controlled by the difference between the voltages applied to the terminals 26 and 27 so that the gain will not vary if the voltage difference is constant although the absolute values of the voltages applied to both the terminals 26 and 27 themselves are varied. Accordingly, the requirement for stabilizing the absolute values of the gain control voltages may be rendered less severe in the circuit according to the invention than in the conventional one.

In the foregoing description, the voltage for automatic gain control and killer action control applied to the terminal 26 is set constant, while the voltage applied to the terminal 27 is varied in response to the variation in the input signal level. However, it should be noted that the roles of the terminals 26 and 27 may be interchanged.

Furthermore, since the circuit embodying the present invention and shown in FIG. 2 is for a chrominance amplifier, the control voltage for killer action is obtained through the transistors 21 and 22. However, in order merely to obtain a circuit for deriving a dc automatic gain control voltage, there is no need for the transistors 21 and 22 to be incorporated and connected in this circuit shown in FIG. 2, but it is only necessary to connect the transistors 23 and 24 with the collectors of the transistors 19 and 20.

What we claim is:

1. A chrominance amplifier consisting of a chrominance amplifier part and a dc amplifier part; said chrominance amplifier part comprising a first differential amplifier constituted of two transistors whose bases are adapted to receive a chrominance signal, and second and third differential amplifiers whose emitter currents are supplied as the collector currents of said two transistors and a fourth differential amplifier constituted of two transistors whose bases are adapted to receive control voltages for automatic gain control and killer action in a differential form; wherein a voltage at a dividing point of a resistance divider connected to each collector circuit of the two transistors constituting said fourth differential amplifier is supplied to said second and third differential amplifiers as differential base bias through first emitter follower transistors, and the output of an output terminal provided at one collector of each of the second and third differential amplifier is controlled by the differential base bias, and the control voltage outputs for killer action are taken out of each collector of the two transistors constituting said fourth differential amplifier through second emitter follower transistors.

* * * * *